US012770135B2

(12) United States Patent
Rule et al.

(10) Patent No.: US 12,770,135 B2
(45) **Date of Patent: *Oct. 20, 2026**

(54) TECHNIQUES TO UTILIZE RESOURCE LOCATORS BY A CONTACTLESS CARD TO PERFORM A SEQUENCE OF OPERATIONS

(71) Applicant: Capital One Services, LLC, McLean, VA (US)

(72) Inventors: Jeffrey Rule, Chevy Chase, MD (US); Kaitlin Newman, Washington, DC (US); Colin Hart, Arlington, VA (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,372

(22) Filed: Oct. 31, 2023

(65) Prior Publication Data

US 2024/0135360 A1 Apr. 25, 2024
US 2024/0232855 A9 Jul. 11, 2024

Related U.S. Application Data

(63) Continuation of application No. 17/235,112, filed on Apr. 20, 2021, now Pat. No. 11,935,035.

(51) Int. Cl.
*G06Q 20/32* (2012.01)
*G06Q 20/34* (2012.01)
(Continued)

(52) U.S. Cl.
CPC ....... *G06Q 20/354* (2013.01); *G06Q 20/3221* (2013.01); *G06Q 20/3223* (2013.01);
(Continued)

(58) Field of Classification Search
CPC ............ G06Q 20/354; G06Q 20/3221; G06Q 20/3223; G06Q 30/01; G06Q 40/02;
(Continued)

(56) References Cited

U.S. PATENT DOCUMENTS

| | | |
|---|---|---|
| 5,590,038 A | 12/1996 | Pitroda |
| 5,666,415 A | 9/1997 | Kaufman |

(Continued)

FOREIGN PATENT DOCUMENTS

| | | |
|---|---|---|
| CN | 101192295 A | 6/2008 |
| GB | 2516861 A | 2/2015 |

(Continued)

OTHER PUBLICATIONS

Author Unknown, “EMV Integrated Circuit Card Specifcations for Payment Systems, Book 2, Security and Key Management,” Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

(Continued)

*Primary Examiner* — Bennett M Sigmond
*Assistant Examiner* — Michael J Warden
(74) *Attorney, Agent, or Firm* — KDW Firm PLLC

(57) ABSTRACT

Embodiments may be generally directed to methods, techniques and devices to utilize a contactless card to perform a series of operations.

20 Claims, 12 Drawing Sheets

(51) Int. Cl.
*H04L 9/32* (2006.01)
*G06Q 40/02* (2023.01)

(52) U.S. Cl.
CPC ............. *H04L 9/32* (2013.01); *G06Q 20/326* (2020.05); *G06Q 20/341* (2013.01); *G06Q 20/352* (2013.01); *G06Q 40/022* (2025.08)

(58) Field of Classification Search
CPC .. G06Q 20/326; G06Q 20/341; G06Q 20/352; G06Q 40/022; H04L 9/32
USPC ............................................................ 705/35
See application file for complete search history.

(56) References Cited

U.S. PATENT DOCUMENTS 6,108,789 A * 8/2000 Dancs ................ G06Q 20/3552
713/168
6,199,114 B1 3/2001 White
6,324,271 B1 11/2001 Sawyer
6,367,011 B1 4/2002 Lee
6,572,015 B1 6/2003 Norton
6,616,535 B1 * 9/2003 Nishizaki ............ G07F 17/3234
463/43
7,252,242 B2 8/2007 Ho
7,270,276 B2 9/2007 Vayssiere
7,287,692 B1 10/2007 Patel
7,374,099 B2 5/2008 de Jong
7,527,208 B2 5/2009 Hammad
7,568,631 B2 8/2009 Gibbs
7,584,153 B2 9/2009 Brown
7,628,322 B2 12/2009 Holtmanns
7,793,851 B2 9/2010 Mullen
7,801,799 B1 9/2010 Brake, Jr.
7,908,216 B1 3/2011 Davis
7,922,082 B2 4/2011 Muscato
8,010,405 B1 8/2011 Bortolin
8,074,877 B2 12/2011 Mullen
8,082,450 B2 12/2011 Frey
8,108,687 B2 1/2012 Ellis
8,186,602 B2 5/2012 Itay
8,196,131 B1 6/2012 von Behren
8,249,654 B1 8/2012 Zhu
8,276,814 B1 10/2012 Davis
8,332,272 B2 12/2012 Fisher
8,346,670 B2 1/2013 Hasson
8,511,547 B2 8/2013 Rans
8,519,822 B2 8/2013 Riegebauer
8,750,514 B2 6/2014 Gallo
8,870,081 B2 10/2014 Olson
9,038,893 B2 5/2015 Kirkham
9,129,199 B2 9/2015 Spodak
9,183,490 B2 11/2015 Moreton
9,275,325 B2 3/2016 Newcombe
9,286,606 B2 3/2016 Diamond
9,306,753 B1 4/2016 Vandervort
9,501,776 B2 11/2016 Martin
9,710,744 B2 7/2017 Wurmfeld
9,949,065 B1 4/2018 Zarakas
9,965,632 B2 5/2018 Zarakas
9,965,911 B2 5/2018 Wishne
9,977,890 B2 5/2018 Alberti
9,978,056 B2 5/2018 Seo
9,978,058 B2 5/2018 Wurmfeld
9,990,795 B2 6/2018 Wurmfeld
10,007,873 B2 6/2018 Heo
10,013,693 B2 7/2018 Wyatt
10,121,130 B2 11/2018 Pinski
10,210,505 B2 2/2019 Zarakas
10,242,368 B1 3/2019 Poole
10,296,910 B1 5/2019 Templeton
10,332,102 B2 6/2019 Zarakas
10,360,557 B2 7/2019 Locke
10,380,471 B2 8/2019 Locke
10,395,244 B1 8/2019 Mossler
10,453,054 B2 10/2019 Zarakas
10,474,941 B2 11/2019 Wurmfeld
10,475,027 B2 11/2019 Guise
10,482,453 B2 11/2019 Zarakas
10,482,457 B2 11/2019 Poole
10,489,774 B2 11/2019 Zarakas
10,489,781 B1 11/2019 Osborn
10,510,070 B2 12/2019 Wurmfeld
10,515,361 B2 12/2019 Zarakas
10,535,068 B2 1/2020 Locke
10,546,444 B2 1/2020 Osborn
10,581,611 B1 3/2020 Osborn
10,664,830 B1 5/2020 Rule
10,685,349 B2 6/2020 Brickell
10,797,882 B2 10/2020 Rule
10,880,741 B2 12/2020 Zarakas
10,909,525 B1 2/2021 Dhodapkar
10,970,691 B2 4/2021 Koeppel
10,984,416 B2 4/2021 Ilincic
11,037,136 B2 6/2021 Rule
11,062,098 B1 7/2021 Bergeron
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler
11,297,958 B2 4/2022 Vukich
11,334,872 B2 5/2022 Phillips
11,361,173 B2 6/2022 Edwards
11,392,933 B2 7/2022 Mossler
11,392,935 B2 7/2022 Suresh
11,416,844 B1 8/2022 Osterkamp
11,423,392 B1 8/2022 Ho
11,443,292 B2 9/2022 Sherif
11,444,770 B2 9/2022 Wieker
11,461,764 B2 10/2022 Rule
11,481,764 B2 10/2022 Shakkarwar
11,521,213 B2 12/2022 Rule
11,551,200 B1 1/2023 Cook
11,556,918 B2 1/2023 Mestre
11,615,395 B2 3/2023 McHugh
11,777,933 B2 10/2023 Moreton
2003/0220876 A1 11/2003 Burger
2005/0156026 A1 7/2005 Ghosh
2005/0228997 A1 10/2005 Bicker
2005/0269402 A1 12/2005 Spitzer
2007/0276765 A1 11/2007 Hazel
2008/0082452 A1 4/2008 Wankmueller
2008/0099552 A1 5/2008 Grillion
2009/0143104 A1 6/2009 Loh
2009/0235339 A1 9/2009 Mennes
2009/0282264 A1 11/2009 Amiel
2011/0113245 A1 5/2011 Varadarajan
2011/0155801 A1 6/2011 Rowberry
2012/0143703 A1 6/2012 Wall
2012/0172026 A1 * 7/2012 Kwon ................. H04W 12/068
455/419
2013/0030997 A1 1/2013 Spodak
2013/0146657 A1 6/2013 Graef
2013/0211937 A1 8/2013 Elbirt
2013/0311363 A1 11/2013 Ramaci
2014/0012751 A1 * 1/2014 Kuhn ................... G06Q 20/367
705/41
2014/0074637 A1 3/2014 Hammad
2014/0074655 A1 3/2014 Lim
2014/0081785 A1 3/2014 Valadas Preto
2014/0143089 A1 * 5/2014 Campos ................. G06Q 20/28
705/26.8
2014/0365377 A1 12/2014 Salama
2015/0032635 A1 1/2015 Guise
2015/0073983 A1 3/2015 Bartenstein
2015/0113271 A1 4/2015 Jooste
2015/0134513 A1 5/2015 Olson
2015/0199673 A1 7/2015 Savolainen
2015/0199863 A1 7/2015 Scoggins
2015/0254637 A1 9/2015 Yang
2015/0317295 A1 11/2015 Sherry
2016/0078430 A1 3/2016 Douglas

(56) References Cited

U.S. PATENT DOCUMENTS

| | | | | |
|---|---|---|---|---|
| 2016/0189143 | A1 | 6/2016 | Koeppel | |
| 2016/0253651 | A1 | 9/2016 | Park | |
| 2016/0277383 | A1 | 9/2016 | Guyomarc'h | |
| 2016/0307189 | A1 | 10/2016 | Zarakas | |
| 2016/0314472 | A1 | 10/2016 | Ashfield | |
| 2016/0364938 | A1* | 12/2016 | Miranda | G06Q 20/3263 |
| 2016/0379217 | A1 | 12/2016 | Hammad | |
| 2017/0017957 | A1 | 1/2017 | Radu | |
| 2017/0039566 | A1 | 2/2017 | Schipperheijn | |
| 2017/0068950 | A1 | 3/2017 | Kwon | |
| 2017/0330173 | A1 | 11/2017 | Woo | |
| 2018/0025349 | A1* | 1/2018 | Marsh | G06Q 20/352 705/41 |
| 2018/0039987 | A1 | 2/2018 | Molino | |
| 2018/0096340 | A1* | 4/2018 | Omojola | H04L 9/50 |
| 2018/0268132 | A1 | 9/2018 | Buer | |
| 2018/0300716 | A1 | 10/2018 | Carlson | |
| 2019/0172055 | A1 | 6/2019 | Hale | |
| 2019/0303945 | A1 | 10/2019 | Mitra | |
| 2020/0106615 | A1 | 4/2020 | Rule et al. | |
| 2020/0246694 | A1* | 8/2020 | Umeki | G06F 9/445 |
| 2020/0302728 | A1 | 9/2020 | Rule et al. | |
| 2021/0004806 | A1 | 1/2021 | Noe | |
| 2021/0042733 | A1* | 2/2021 | Suresh | G06Q 20/352 |
| 2021/0272098 | A1 | 9/2021 | Delsuc | |
| 2021/0304189 | A1 | 9/2021 | Gupta | |
| 2021/0383360 | A1 | 12/2021 | Sinha | |
| 2021/0406869 | A1 | 12/2021 | Pathrabe | |
| 2022/0114581 | A1 | 4/2022 | Upadhye | |
| 2022/0284416 | A1 | 9/2022 | Rule | |
| 2022/0309509 | A1 | 9/2022 | Akgun | |
| 2022/0335412 | A1 | 10/2022 | Rule | |
| 2022/0366410 | A1 | 11/2022 | Rule | |
| 2022/0398566 | A1 | 12/2022 | Rule | |
| 2022/0414648 | A1 | 12/2022 | Rule | |
| 2023/0054157 | A1 | 2/2023 | Mao | |
| 2023/0065163 | A1 | 3/2023 | Vargas | |
| 2023/0083785 | A1 | 3/2023 | Maiman | |
| 2023/0169505 | A1 | 6/2023 | Rule | |
| 2023/0354020 | A1 | 11/2023 | Rule | |
| 2023/0359839 | A1 | 11/2023 | Lovgren | |

FOREIGN PATENT DOCUMENTS

| | | | |
|---|---|---|---|
| GB | 2551907 | A | 1/2018 |
| JP | 2001306526 | A | 11/2001 |
| JP | 2006004327 | A | 1/2006 |
| JP | 2009146170 | A | 7/2009 |
| JP | 2021028830 | A | 2/2021 |
| KR | 20150140132 | A | 12/2015 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

TECHNIQUES TO UTILIZE RESOURCE LOCATORS BY A CONTACTLESS CARD TO PERFORM A SEQUENCE OF OPERATIONS

CROSS-REFERENCE TO RELATED APPLICATIONS

This application is a continuation of U.S. patent application Ser. No. 17/235,112, filed on Apr. 20, 2021, the disclosure of which is incorporated herein by referenced in its entirety.

BACKGROUND

Millions of individuals enjoy the convenience of utilizing credit cards, charge cards, debit cards, or “smart” cards as a convenient way in which to purchase goods and/or services. By utilizing these types of cards, an individual may enter into a transaction without having to have cash or currency in hand or otherwise. In the case of credit cards, charge cards and debit cards, the individual, in effect obtains an instant loan of the funds needed to make a purchase and/or enter into a transaction.

To utilize these cards customers typically must go through an activation process to activate the card. Activating a card generally involves a time-consuming process of cardholders calling a telephone number or visiting a website and entering or otherwise providing card information. However, current solutions are problematic and are subject to human error. because they require the customer to enter information and are subject to errors. Accordingly, there is an improved method of activating a card.

BRIEF SUMMARY

Embodiments may be generally directed to systems, devices, and techniques including a computer-implemented method to perform an activation for a contactless card via a mobile device. The technique may include receiving a first uniform resource locator (URL) for an application from the contactless card via a wireless interface, the application configured to perform the activation, and launching the application responsive to receiving the first URL. The technique may include writing a second URL for conditions to the contactless card via the wireless interface, receiving the second URL to the conditions from the contactless card via the wireless interface, and presenting the conditions on a display of the mobile device. The technique may also include writing a third URL for a first unique identifier to identify a customer associated with the contactless card, receiving the third URL to affirm the conditions; and determining the contactless card is activated responsive, at least in part, to the conditions being affirmed.

Embodiments may be also be generally directed to techniques, and systems including an apparatus to exchange universal resource locators with a contactless card, including a processor, and memory comprising instructions that may be executed by the processor. The processor, when executing the instructions may receive a first uniform resource locator (URL) for an application from the contactless card via a wireless interface, the application configured to perform an operation for the contactless card, launch the application responsive to reception of the first URL, and write a second URL for conditions to the contactless card via the wireless interface. The processor may also receive the second URL to the conditions from the contactless card via the wireless interface, present the conditions on a display, write a third URL for a first unique identifier to identify a customer associated with the contactless card, and receive the third URL from the contactless card to affirm the conditions.

Embodiments may also include a non-transitory computer-readable medium comprising a set of instructions that, in response to being executed by a processor circuit of a contactless card, cause the processor circuit to send, responsive to a first wireless read, a first uniform resource locator (URL) for an application to a mobile device via a wireless interface, the first URL stored in a memory of a contactless card, and store, in the memory, a second URL for conditions related to the contactless card, the second URL received from the mobile device. Embodiments also include the processor circuit configured to send, responsive to a second wireless read, the second URL to the conditions to the mobile device, store, in the memory, a third URL for a unique identifier to identify a customer associated with the contactless card, and send, responsive to a third wireless read, the third URL to affirm the conditions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

BRIEF DESCRIPTION OF THE SEVERAL VIEWS OF THE DRAWINGS

Figure 1:
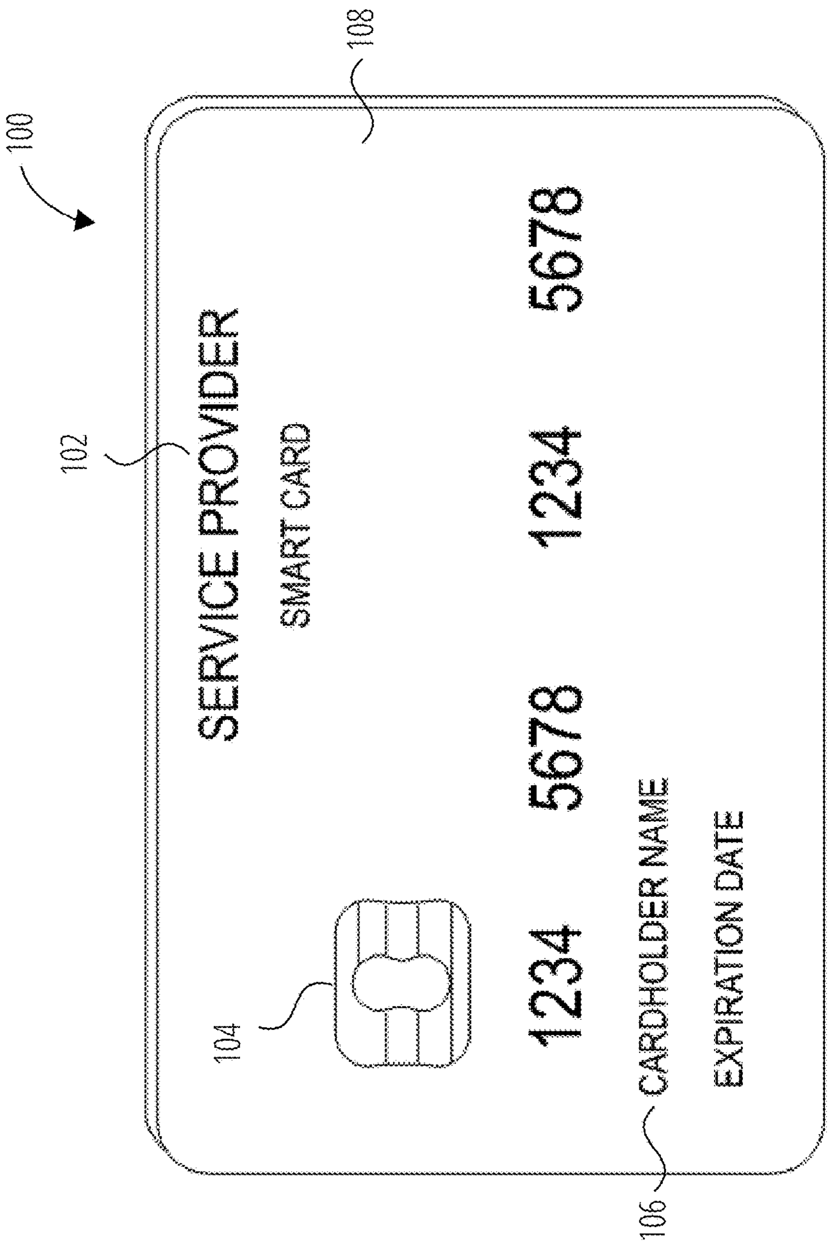

FIG. 1 illustrates a contactless card 100 in accordance with embodiments.

Figure 2:
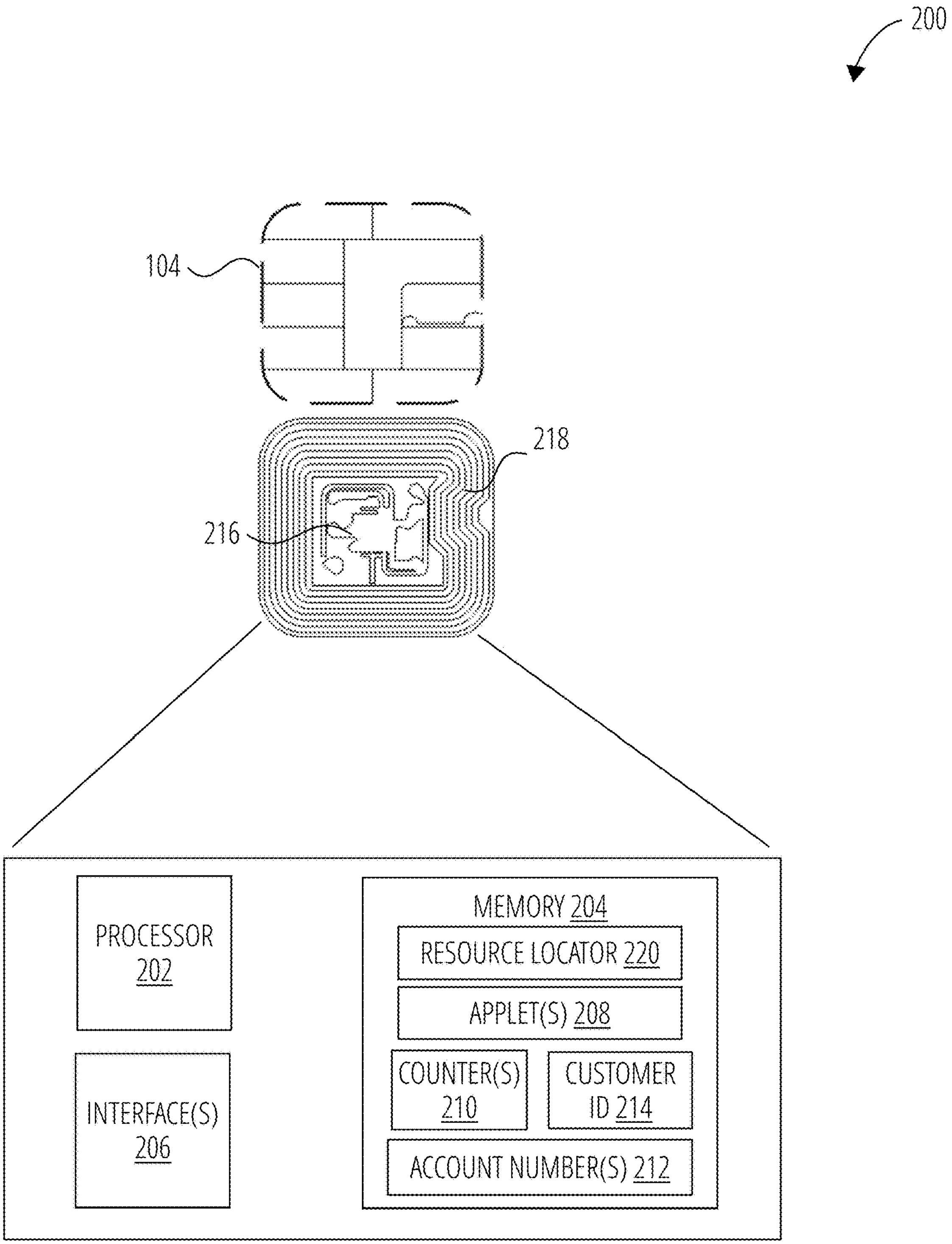

FIG. 2 illustrates a contactless card component 200 in accordance with embodiments.

Figure 3:
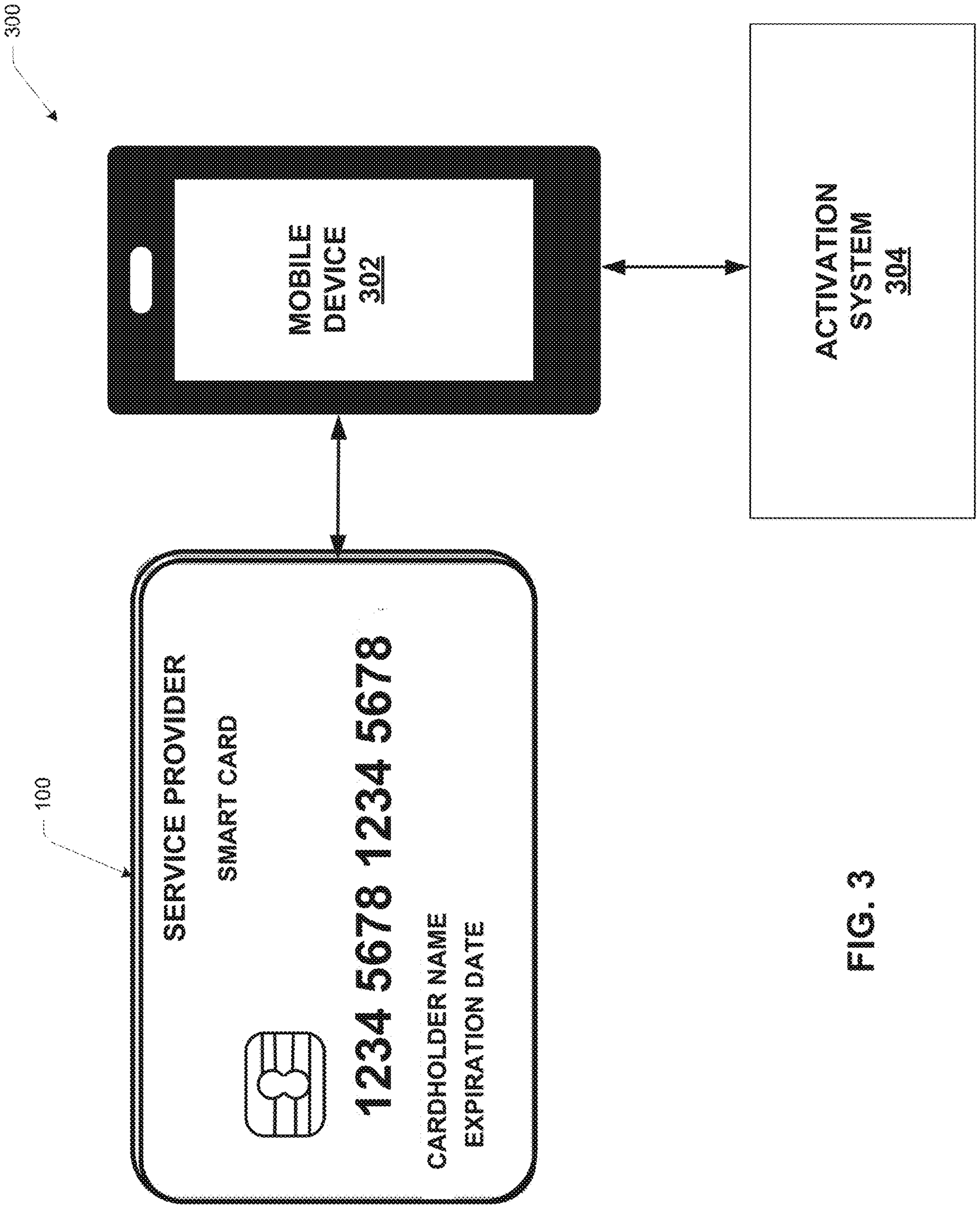

FIG. 3 illustrates an aspect of the subject matter in accordance with embodiments.

Figure 4:
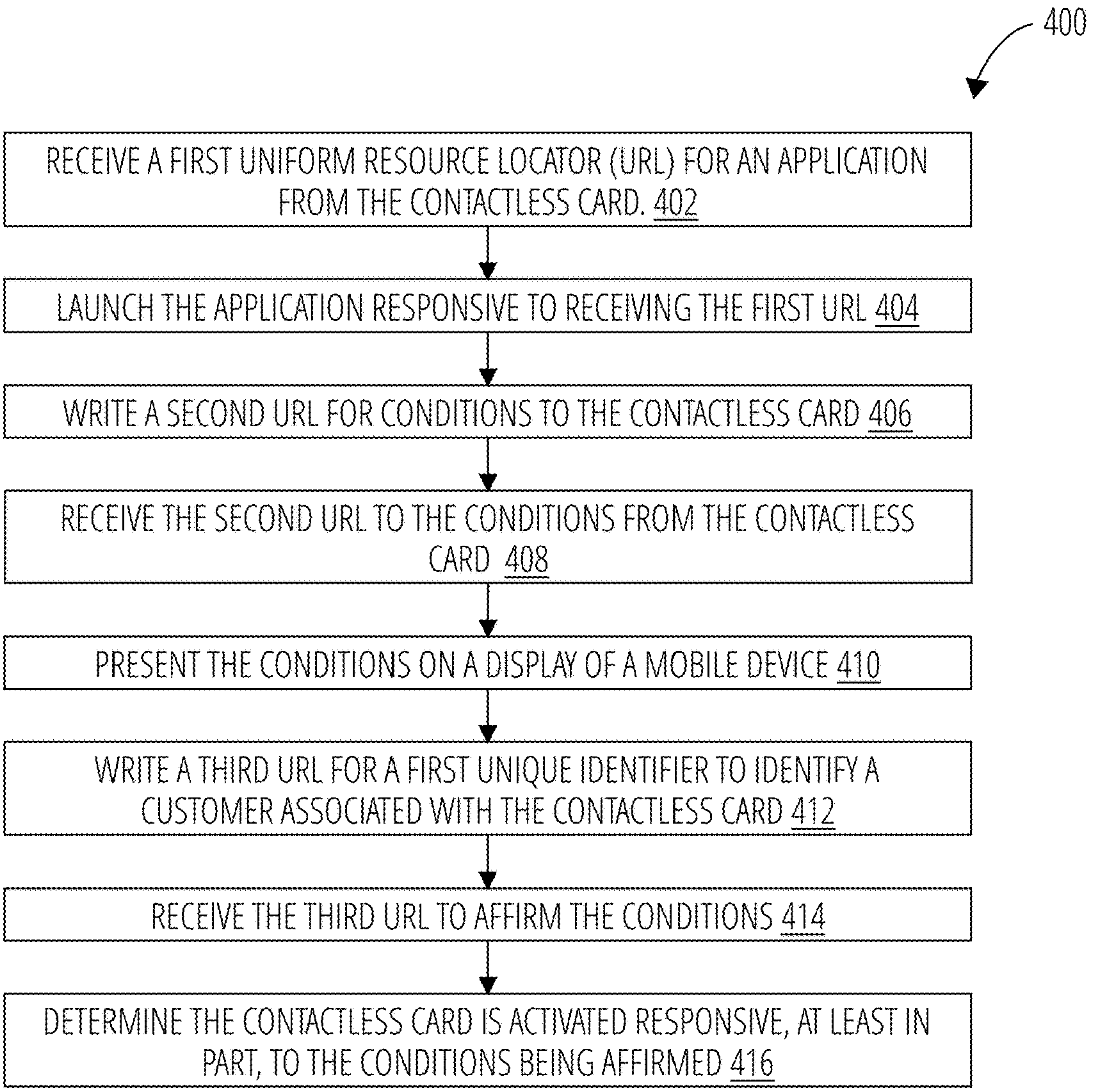

FIG. 4 illustrates a routine 400 in accordance embodiments.

Figure 5:
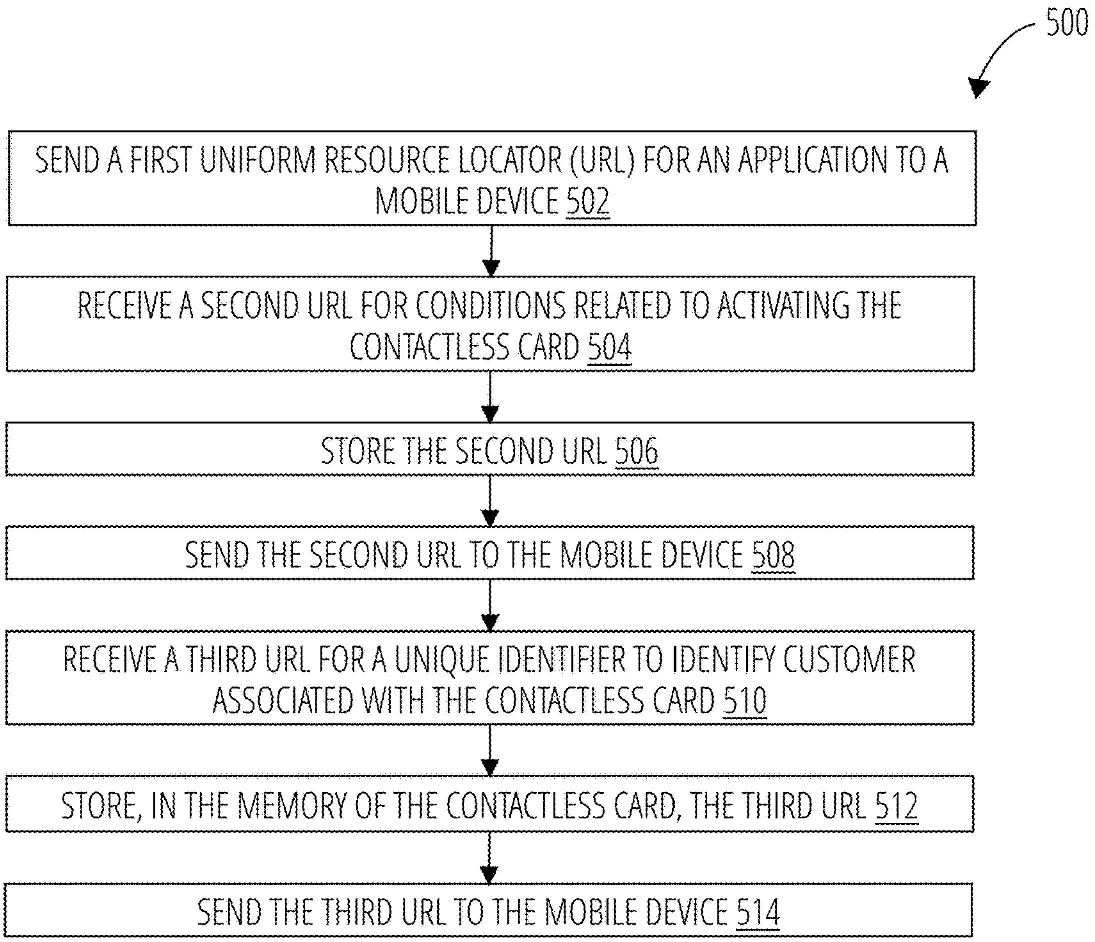

FIG. 5 illustrates a routine 500 in accordance with embodiments.

Figure 6:
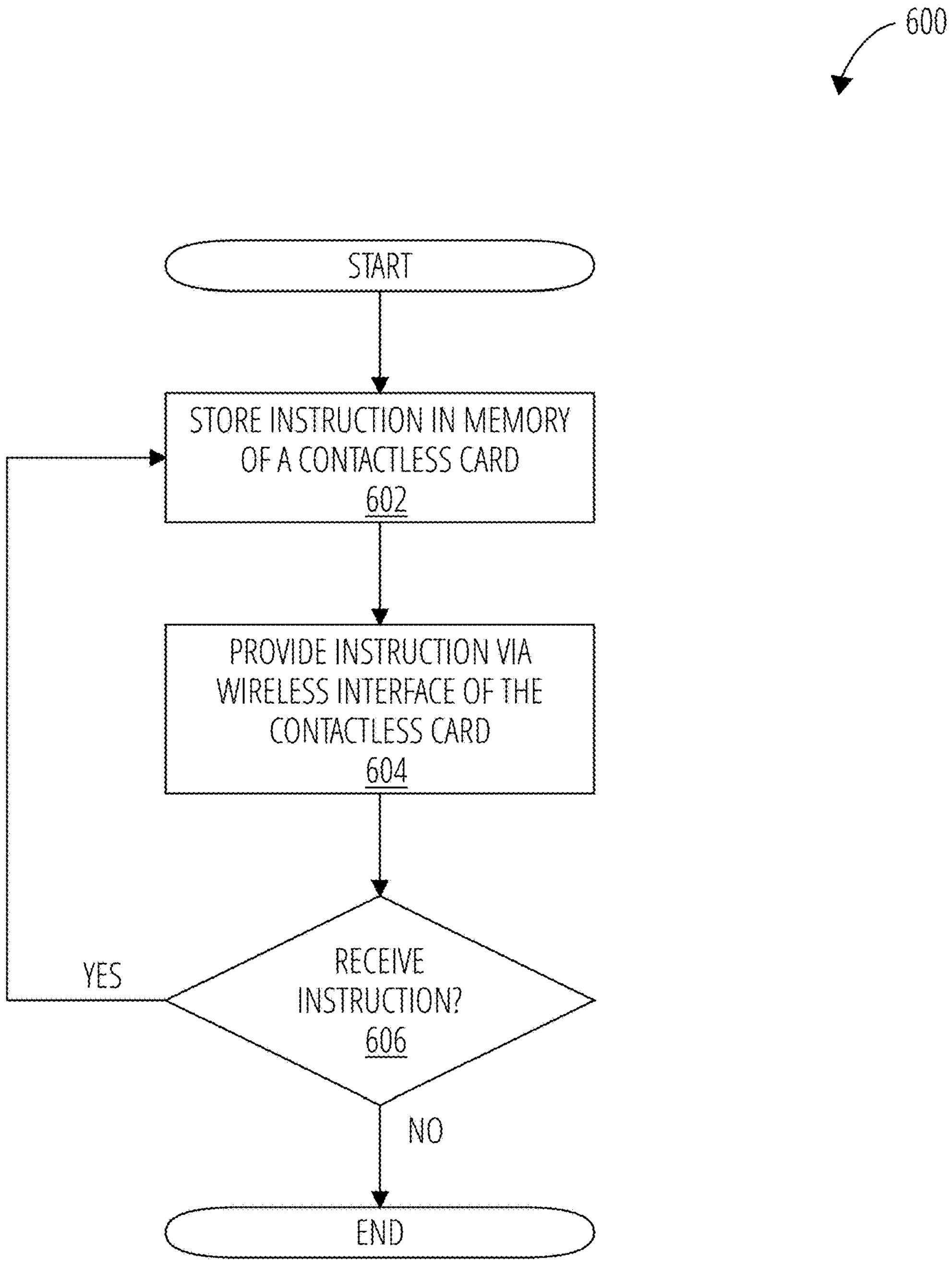

FIG. 6 illustrates a routine 600 in accordance with embodiments.

Figure 7:
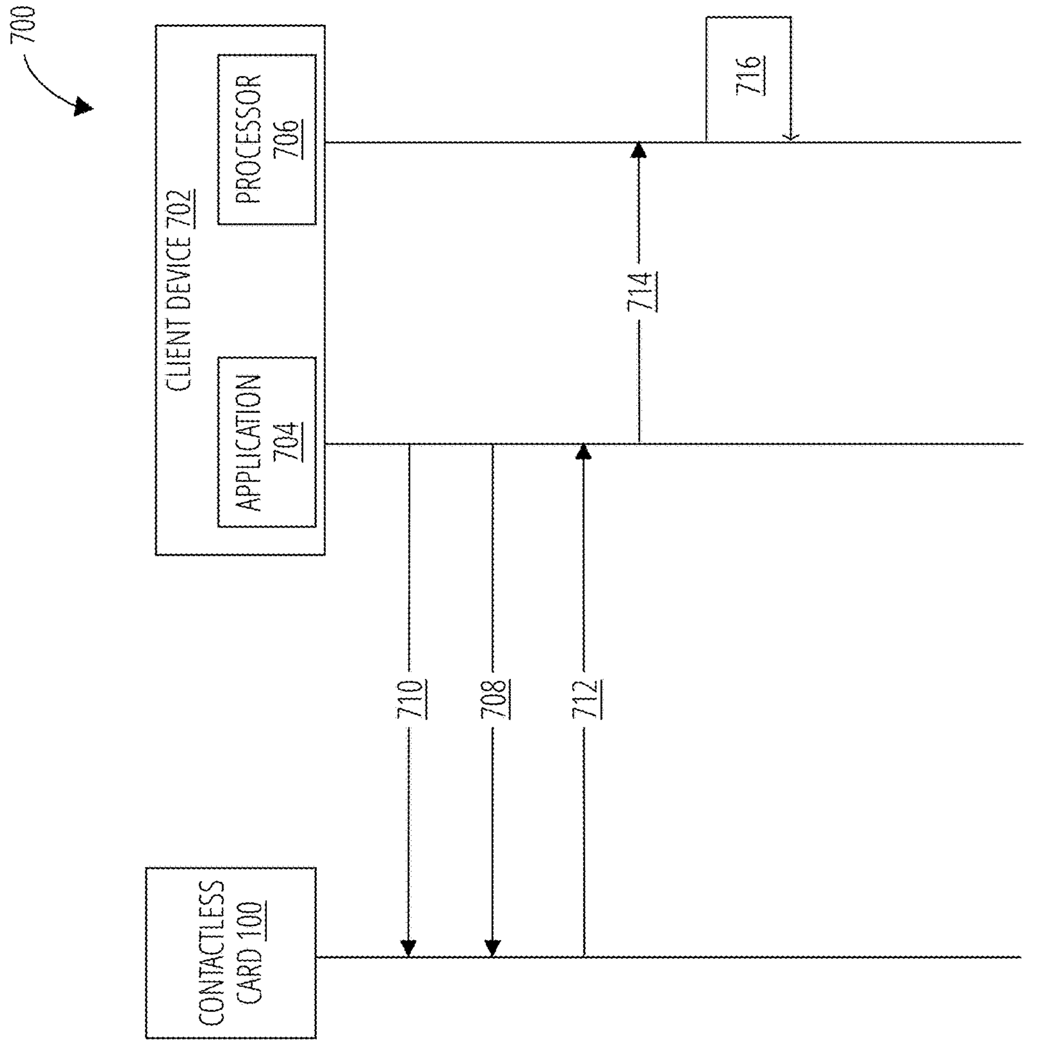

FIG. 7 illustrates a sequence flow 700 in accordance with embodiments.

Figure 8:
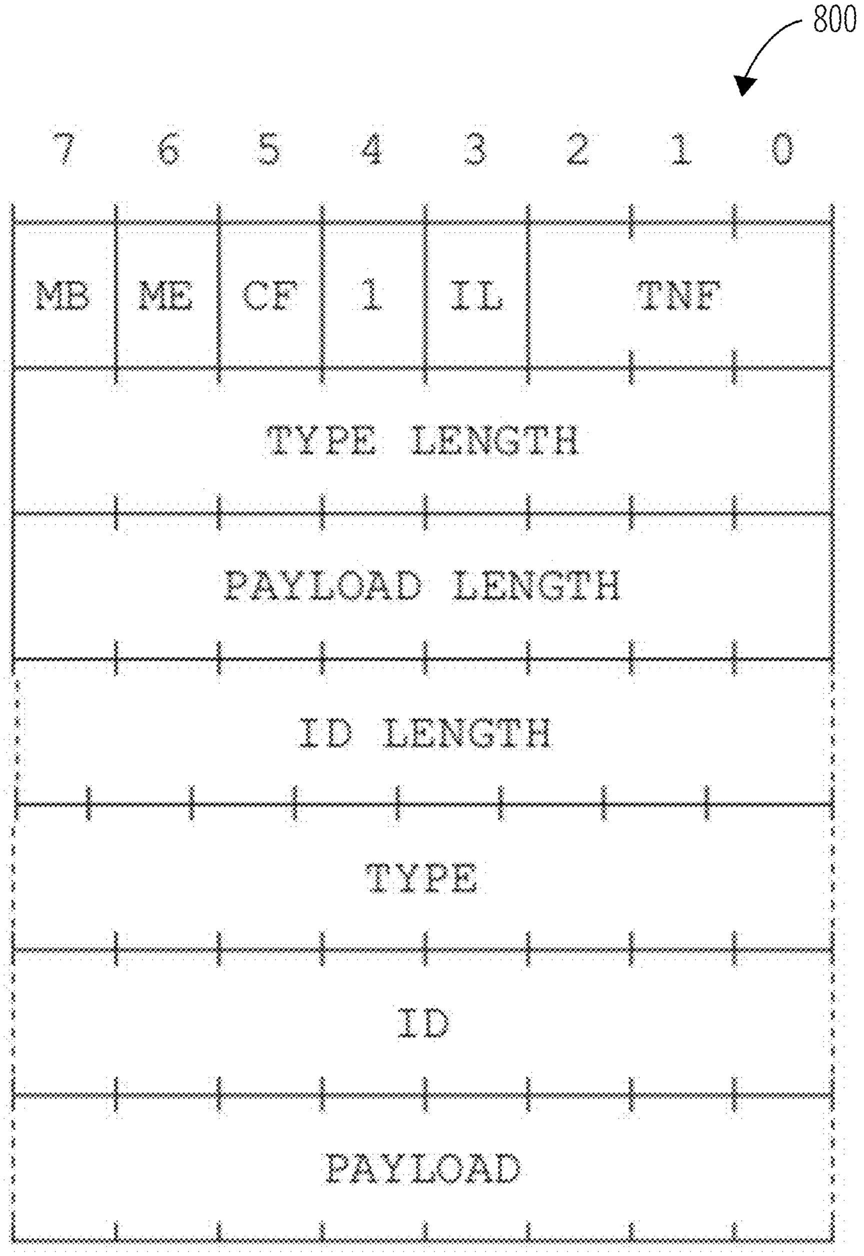

FIG. 8 illustrates a data structure 800 in accordance embodiments.

Figure 9:
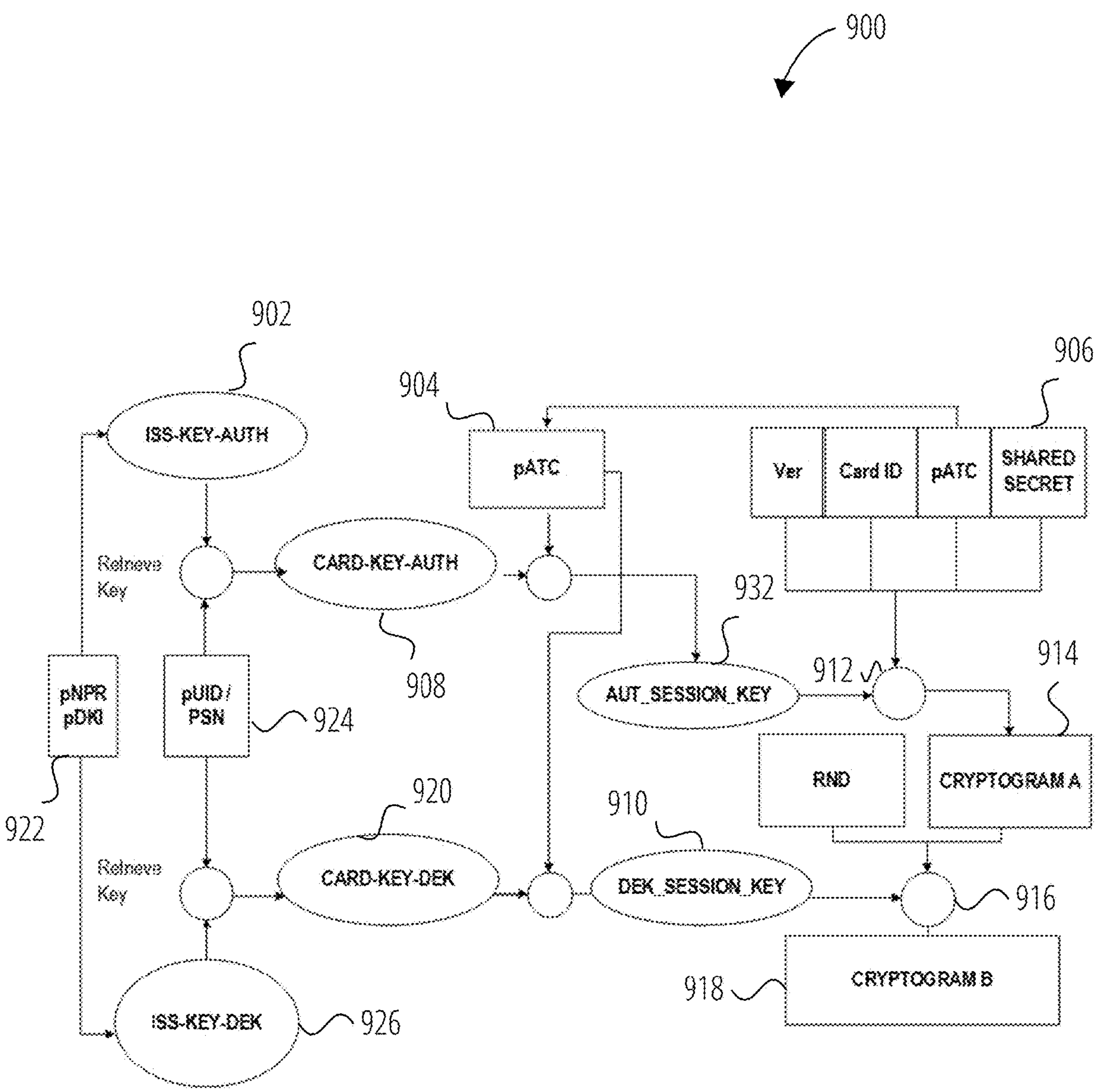

FIG. 9 is a diagram of a key system according to an example embodiment.

Figure 10:
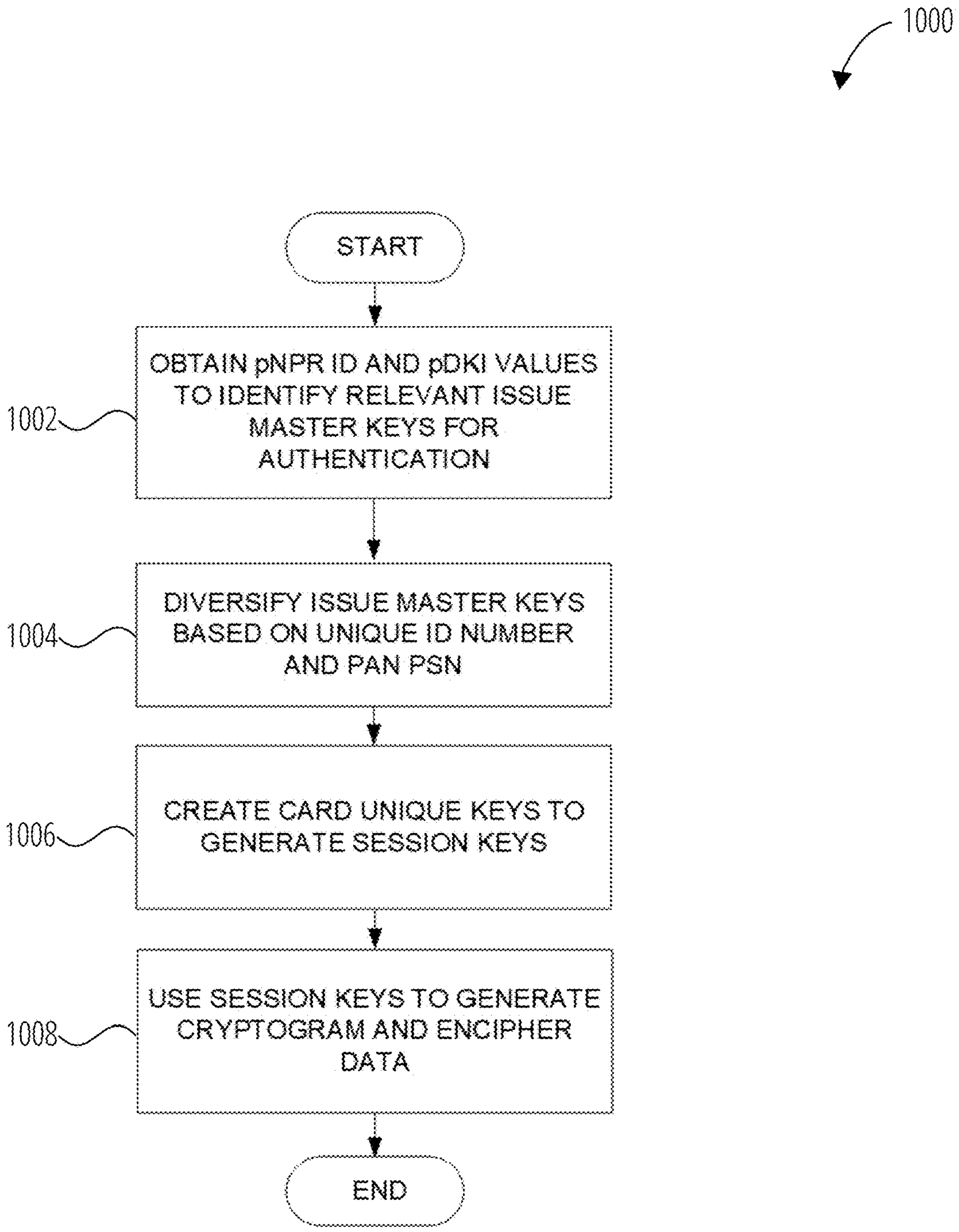

FIG. 10 is a flowchart of a method of generating a cryptogram according to an example embodiment.

Figure 11:
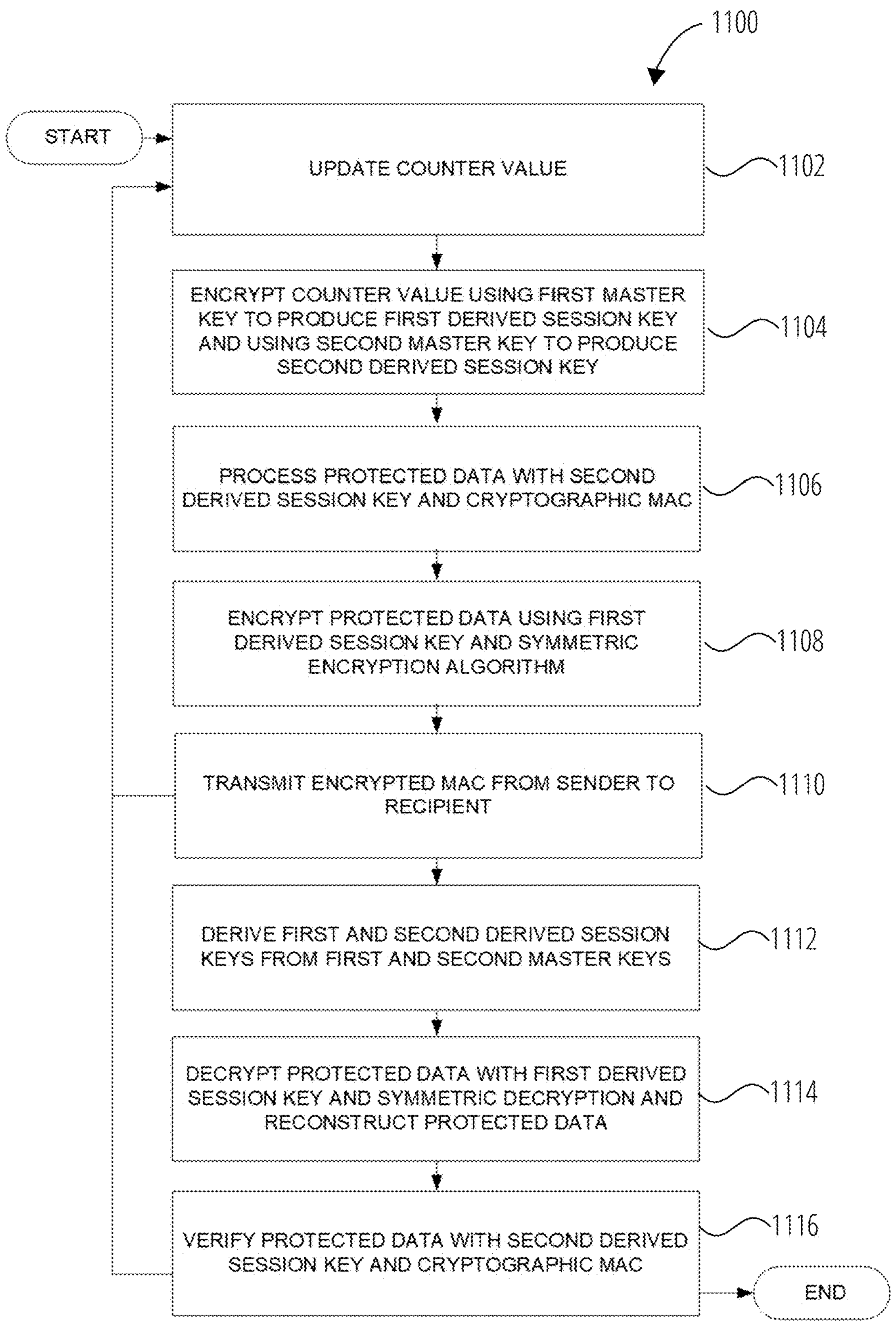

FIG. 11 illustrates an aspect of the subject matter in accordance with embodiments.

Figure 12:
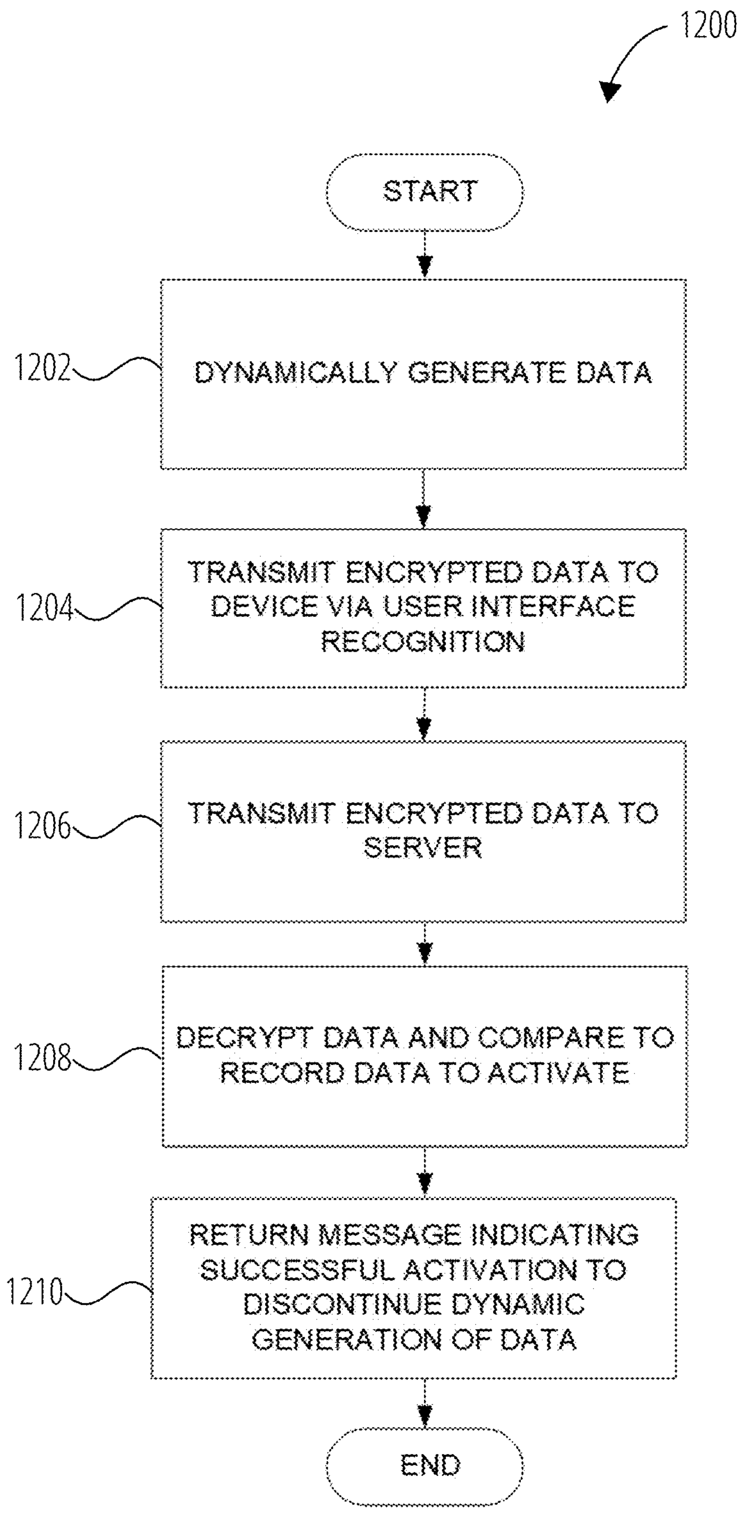

FIG. 12 illustrates an aspect of the subject matter in accordance with embodiments.

DETAILED DESCRIPTION

Embodiments may be generally directed to methods, devices, and systems to perform an activation for contactless cards, such a credit cards and debit cards. Typically, a customer may receive a contactless card in the mail or from a banking branch in a nonactive state. To activate the card, the customer must go through a process, which usually includes calling a telephone number and/or visiting a website. The customer is then required to enter information, such as the account number on the face of the card, and a backend activation system operated and/or controlled by the bank performs an activation sequence to activate the card. However, these current solutions are problematic because they require the customer to enter information and are subject to errors. For example, the customer may incorrectly enter a digit of the account number when entering the number via a telephone keypad or keyboard. In these situations, the activation system typically does not tell the customer of their error for security purposes, and merely ceases the activation attempt, e.g., hangs up on the customer or states that the activation cannot be completed.

Embodiments discussed herein provide improvements for these issues and in one or more technical fields or technology areas, e.g., electronic activation of contactless cards. Embodiments discussed include a customer receiving a contactless card from a card issuer with minimal instructions. For example, the instructions may merely tell the customer to turn on the near-field communication (NFC) interface on their mobile device. The customer may then be instructed to perform a series of taps with the card on and/or near the mobile device to go through steps required to activate the card. Tapping the card on the mobile device ensures that the customer brings the contactless card within operating range of the device and a wireless exchange of information can occur. In one example, the customer may be instructed to tap the contactless card on a surface of the mobile device, such as on display. Bringing the contactless card within range of the mobile device may cause an action or a series of actions to occur to perform an operation, such as activate the contactless card.

In one specific example, the contactless card may be sent to the user programmed with a resource locator, such as a uniform resource locator (URL), a uniform resource identifier (URI), a uniform resource name (URN), or the like. The resource locator may be stored in the memory of the contactless card, for example and may be communicated to the mobile device as part of a read operation performed by the mobile device when the contactless card is brought in range. The mobile device may perform an action based on receiving the resource locator. For example, the resource locator may be a link or instruction to launch an application (app) store or a banking app. The mobile device, upon reception of the resource locator, may launch the app store to download an app, such as a banking app related to the contactless card. In some instances, the app may already be installed on the mobile device and the resource locator may cause the banking app to launch. The mobile device including the app may have the customer go through a series of actions, where the next action is initiated when the card is brought into the wireless communication range of the mobile device. For example, the customer may be instructed to tap the contactless card again to launch a set of terms and conditions to read through once the application is installed/launched on the mobile device. The customer may provide another tap to accept a term of service for the contactless card and authorize the mobile device to activate the card by communicating with an activation server. Once activated, the card may be in an activated state and then each additional tap may cause the same action to occur, e.g., the banking app is launched to a landing page that may show details relating to the account.

Embodiments discussed herein are not limited to performing an activation process. For example, the operations discussed herein may be used to cause any number of operations or a series of actions to be performed and the contactless cards may be utilized as a state machine to hold instructions for a next step in the series of steps to perform operations. As will become more apparent in the follow description, when the contactless card is brought into wireless operation range of a device, a communication exchange may occur between the device and the card, e.g., read/write operations. For example, the device may read the resource locator from the card and m write a new instruction or resource locator to the memory of the card. The instruction or resource locator may be used by the contactless to hold a state or step in a series of steps to perform an operation. Upon the next read operation, the contactless card may provide the instruction or resource locator to the reading device to cause the next step. These and other details will become more apparent in the follow description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example configuration of a contactless card 100, which may include a transaction card, a payment card, such as a credit card, debit card, or gift card, issued by a service provider as displayed as service provider indicia 102 on the front or back of the contactless card 100. In some examples, the contactless card 100 is not related to a payment card, and may include, without limitation, an identification card. In some examples, the transaction card may include a dual interface contactless payment card, a rewards card, and so forth. The contactless card 100 may include a substrate 108, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 100 may have physical characteristics compliant with the ID-1 format of the ISO/IEC 7816 standard, and the transaction card may otherwise be compliant with the ISO/IEC 14443 standard. However, it is understood that the contactless card 100 according to the present disclosure may have different characteristics, and the present disclosure does not require a transaction card to be implemented in a payment card.

The contactless card 100 may also include identification information 106 displayed on the front and/or back of the card, and a contact pad 104. The contact pad 104 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 100 may also include processing circuitry, antenna and other components as will be further discussed in FIG. 2. These components may be located behind the contact pad 104 or elsewhere on the substrate 108, e.g. within a different layer of the substrate 108, and may electrically and physically coupled with the contact pad 104. The contactless card 100 may also include a magnetic strip or tape, which may be located on the back of the card (not shown in FIG. 1). The contactless card 100 may also include an NFC device coupled with an antenna capable of communicating via the NFC protocol. Embodiments are not limited in this manner.

As illustrated in FIG. 2, the contact pad 104 of contactless card 100 may include processing circuitry 216 for storing, processing, and communicating information, including a processor 202, a memory 204, and one or more interface(s) 206. It is understood that the processing circuitry 216 may contain additional components, including processors, memories, error and parity/CRC checkers, data encoders, anticollision algorithms, controllers, command decoders, security primitives and tamper proofing hardware, as necessary to perform the functions described herein.

The memory 204 may be a read-only memory, write-once read-multiple memory or read/write memory, e.g., RAM, ROM, and EEPROM, and the contactless card 100 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programed and re-programed many times after leaving the factory. A read/write memory may also be read many times after leaving the factory. In some instances, the memory 204 may be encrypted memory utilizing an encryption algorithm executed by the processor 202 to encrypted data.

The memory 204 may be configured to store one or more applet(s) 208, one or more counter(s) 210, a customer identifier 214, and the account number(s) 212, which may be virtual account numbers. The one or more applet(s) 208 may comprise one or more software applications configured to execute on one or more contactless cards, such as a Java® Card applet. However, it is understood that applet(s) 208 are not limited to Java Card applets, and instead may be any software application operable on contactless cards or other devices having limited memory. The one or more counter(s) 210 may comprise a numeric counter sufficient to store an integer. The customer identifier 214 may comprise a unique alphanumeric identifier assigned to a user of the contactless card 100, and the identifier may distinguish the user of the contactless card from other contactless card users. In some examples, the customer identifier 214 may identify both a customer and an account assigned to that customer and may further identify the contactless card 100 associated with the customer's account. As stated, the account number(s) 212 may include thousands of one-time use virtual account numbers associated with the contactless card 100. An applet(s) 208 of the contactless card 100 may be configured to manage the account number(s) 212 (e.g., to select an account number(s) 212, mark the selected account number(s) 212 as used, and transmit the account number(s) 212 to a mobile device for auto filling by an auto filling service.

The processor 202 and memory elements of the foregoing exemplary embodiments are described with reference to the contact pad 104, but the present disclosure is not limited thereto. It is understood that these elements may be implemented outside of the contact pad 104 or entirely separate from it, or as further elements in addition to processor 202 and memory 204 elements located within the contact pad 104.

In some examples, the contactless card 100 may comprise one or more antenna(s) 218. The one or more antenna(s) 218 may be placed within the contactless card 100 and around the processing circuitry 216 of the contact pad 104. For example, the one or more antenna(s) 218 may be integral with the processing circuitry 216 and the one or more antenna(s) 218 may be used with an external booster coil. As another example, the one or more antenna(s) 218 may be external to the contact pad 104 and the processing circuitry 216.

In an embodiment, the coil of contactless card 100 may act as the secondary of an air core transformer. The terminal may communicate with the contactless card 100 by cutting power or amplitude modulation. The contactless card 101 may infer the data transmitted from the terminal using the gaps in the contactless card's power connection, which may be functionally maintained through one or more capacitors. The contactless card 100 may communicate back by switching a load on the contactless card's coil or load modulation. Load modulation may be detected in the terminal's coil through interference. More generally, using the antenna(s) 218, processor 202, and/or the memory 204, the contactless card 101 provides a communications interface to communicate via NFC, Bluetooth, and/or Wi-Fi communications.

As explained above, the contactless card 100 may be built on a software platform operable on smart cards or other devices having limited memory, such as JavaCard, and one or more or more applications or applets may be securely executed. Applet(s) 208 may be added to contactless cards to provide a one-time password or passcode (OTP) for multifactor authentication (MFA) in various mobile application-based use cases. Applet(s) 208 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 208 may be configured to encode the OTP as an NDEF type 4 well known type text tag. In some examples, NDEF messages may comprise one or more records. The applet(s) 208 may be configured to add one or more static tag records in addition to the OTP record.

In some examples, the one or more applet(s) 208 may be configured to emulate an RFID tag. The RFID tag may include one or more polymorphic tags. In some examples, each time the tag is read, different cryptographic data is presented that may indicate the authenticity of the contactless card. Based on the one or more applet(s) 208, an NFC read of the tag may be processed, the data may be transmitted to a server, such as a server of a banking system, and the data may be validated at the server.

In some examples, the contactless card 100 and server may include certain data such that the card may be properly identified. The contactless card 100 may include one or more unique identifiers (not pictured). Each time a read operation takes place, the counter(s) 210 may be configured to increment. In some examples, each time data from the contactless card 100 is read (e.g., by a mobile device), the counter(s) 210 is transmitted to the server for validation and determines whether the counter(s) 210 are equal (as part of the validation) to a counter of the server.

The one or more counter(s) 210 may be configured to prevent a replay attack. For example, if a cryptogram has been obtained and replayed, that cryptogram is immediately rejected if the counter(s) 210 has been read or used or otherwise passed over. If the counter(s) 210 has not been used, it may be replayed. In some examples, the counter that is incremented on the card is different from the counter that is incremented for transactions. The contactless card 101 is unable to determine the application transaction counter(s) 210 since there is no communication between applet(s) 208 on the contactless card 100.

In some examples, the counter(s) 210 may get out of sync. In some examples, to account for accidental reads that initiate transactions, such as reading at an angle, the counter(s) 210 may increment but the application does not process the counter(s) 210. In some examples, when the mobile device 10 is woken up, NFC may be enabled and the device 110 may be configured to read available tags, but no action is taken responsive to the reads.

To keep the counter(s) 210 in sync, an application, such as a background application, may be executed that would be configured to detect when the mobile device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter(s) 210 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 210 increases in the appropriate sequence, then it possible to know that the user has done so.

The key diversification technique described herein with reference to the counter(s) 210, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 100, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 100. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

In embodiments, the contactless card 100 may store a resource locator 220 in the memory 204. For example, during the creation process, a resource locator 220 used to start an activation process may be written to the memory 204. During the activation process, a device, such as a mobile device, may perform an NDEF read operation to read the resource locator 220. In one example, the contactless card may be initiated with a resource locator 220 that points to an app store to download an app relating to the contactless card. For example, the resource locator 220 may be "https://play.google.com/store/apps/details?id=<package_name>," where package_name may reference the app. In another example, the resource locator 220 may be "http://apps.apple.com/<country>/app/<app-name>/id<store-ID>," where app-name and id are references to download the app. In embodiments, the memory 204 may include both resource locators such that the customer may use any device having the Android® Operating System or Apple® Operating System to activate the contactless card. In some instances, the app may already be installed on the mobile device and the resource locator 220 may cause the operating system of the mobile device to launch the app. For example, upon receiving the resource locator 220 the mobile device may check whether the app is installed and, if so, the operating system will skip the installation process and launch the app.

In embodiments, the contactless card 100 including the resource locator 220 may be utilized as a "state machine," where the next operation in a series of operations may be stored in the resource locator 220 until it is ready to be executed/processed by an external device (mobile device). The resource locator 220 in memory 204 may be updated with a new instruction or locator for the series of operations until the series is complete.

A device, such as a mobile device, may write to the memory 204 using an NDEF write or rewrite instruction to the update the resource locator 220. For example, during the activation process, a mobile device may read the resource locator 220 to install and/or launch an app relating the contactless card. The mobile device may also perform a write operation to write a new resource locator 220 to the memory 204 for the next operation to be performed. In some embodiments, the next operation may require the customer to review the terms and conditions associated with the contactless card and the mobile device may write a link to the terms and conditions for the resource locator 220 in the memory 204. In one example, the link may be a deep link to a local location within the app on the mobile device. In another example, the link may be an external link (outside of the app) to launch a website in a web browser on the mobile device. Embodiments are not limited to these examples.

In embodiments, once the device receives the resource locator from the contactless card 100, the device may write the next operation as a resource locator to the card. For example, the device may write a unique identifier that may be utilized by a customer to accept the terms and conditions. Specifically, when the customer has read through and is ready to accept the terms and conditions, the customer may bring the contactless card 100 within range of the device, and the device may perform an NFC read operation to read the resource locator including the unique identifier. The device may determine the terms and conditions are accepted and perform an activation with an activation server/system.

The contactless card component 200 including the memory 204 may be updated with one or more resource locators 220 during the activation sequence. Each time, the contactless card 100 is brought within range (NFC range), the resource locator 220 may be updated with a different/new resource locator or instruction to perform the next operation for the activation sequence on the mobile device. A mobile device may perform an NDEF write operation to write a new resource locator 220 into the memory 204. Each of the different resource locators 220 may cause the mobile device to perform different operations, such as downloading/launching an app, presenting the terms and conditions, and accepting the terms and conditions, as previously discussed. Once activated, the resource locator 220 may store an instruction or resource locator to cause the app on the mobile device to initiate to a landing page. For example, the resource locator 220 may cause the app to initiate to a page showing information for the account associated with the contactless card, e.g., account balance, payment activity, transactions, awards/rewards, etc. The contactless card 200 may store the resource locator 220 and cause the app to launch to the landing page until the resource locator 220 is updated with a new instruction to perform another operation.

FIG. 3 illustrates an example system 300 that may be utilized to perform an activation for a contactless card. In the illustrated example, the system 300 includes a contactless card 100, a mobile device 302, and an activation system 304. The components of system 300 may be configured to communicate with each via one or more wired and/or wireless interconnects. For example, the contactless card 100 may be configured to communicate with the mobile device 302 via a wireless interconnect in accordance with a wireless protocol, such as NFC®, Bluetooth®, Wireless Fidelity (WiFi), and so forth. The mobile device 302 may also be configured to communicate with the activation system 304 in accordance wireless and/or wired protocols.

In embodiments, the system 300 may be utilized by a customer to activate the contactless card 100 via the mobile device 302. For example, the contactless card 100 may be configured with a resource locator during creation that causes an operating system on the mobile device 302 to install or initiate an app associated with the contactless card 100. In operation, the contactless card 100 may be provided to the customer with instructions to turn on a short-range radio on the mobile device 302, such as an NFC interface, and bring the contactless card 100 within range of the mobile device 302. The range may be the operating range for the short-range radio satisfied by tapping the card on the mobile device 302. In one example, the range may be the operating range in accordance with the NFC standard. The mobile device 302 may detect the contactless card 100 and perform an exchange with the contactless card 100 to establish communications, e.g., an NFC exchange.

The mobile device 302 communicating with the contactless card 100 may perform a read operation (NFC read) to read data from the memory of the contactless card 100. In embodiments, the read operation may refer to a memory location or another identifier to read a resource locator stored in the memory. The contactless card 100 including circuitry may process the read operation, retrieve the resource locator from memory, and provide the resource locator to the mobile device 302. The mobile device 302 may process the data including the resource locator received from the contactless card 100. In this example, the operating system of the mobile device 302 may launch an app store to download a banking app or initiate the banking app if the app is already installed on the mobile device 302.

In some instances, a customer may be required to perform a number of steps to perform the activation of the contactless card 100. The mobile device 302 may write a new resource locator into the memory of the contactless card 100 to perform each new operation. For example, in response to initiating the app on the mobile device 302, the mobile device 302 including the app may write (NFC write operation) a new resource locator to the memory of the contactless card 100. The new resource locator may be an instruction or a link (deep link) pointing to terms and conditions associated with the contactless card 100. Thus, the next time the contactless card 100 is brought into communication range of the mobile device 302, the mobile device 302 may perform another NFC read operation, receive the updated resource locator from the contactless card 100 and perform one or more operations to process the resource locator. For example, the mobile device 302 may process the resource locator, which may cause the app to present the terms and conditions in a graphical user interface (GUI) on a display of the banking app or a web browser of the mobile device 302.

In embodiments, the contactless card 100 may be used to authenticate the user and accept the terms and conditions. For example, the mobile device 302 may obtain a unique identifier associated with the customer. The mobile device 302 may require the customer to enter a credential, such as a password, a unique pattern, a biometric, a passcode, etc., and the mobile device 302 may obtain and/or generate a unique identifier for the customer based on the entered credential. In some instances, the mobile device 302 may generate a random alphanumeric sequence for the unique identifier. Embodiments are not limited in this manner.

The mobile device 302 may perform a write operation to write a new resource locator including the unique identifier. Once the customer is ready to accept the terms and conditions, the mobile device 302 may instruct the customer to bring the card within range. The mobile device 302 may perform a read operation to read the resource locator including the unique identifier and activate the contactless card 100.

To perform the activation, the mobile device 302 may communicate data with the activation system 304. The data may include information to identify the customer, identify the contactless card 100, confirm the terms and conditions are accepted, and so forth. The activation system 304 may process the data and confirm that the contactless card 100 is activated or failed activation to the mobile device 302. The mobile device 302 may display information in the app GUI indicating whether the contactless card 100 is activated or not activated.

In some instances, the contactless card 100 may generate and communicate the unique identifier with an OTP to perform authentication operations. For example, to accept the terms and conditions and/or launch the banking app to a landing page with sensitive information, the mobile device 302 may instruct the customer to bring the contactless card 100 within range of the mobile device 302. Once in range, the contactless card 100 and mobile device 302 may perform an NFC exchange. For example, the contactless card 100 including instructions may be configured to respond to one or more requests, such as near field data exchange requests, from a mobile NFC reader of the mobile device 302 and produce an NDEF message that includes a cryptographically secure OTP encoded as an NDEF text tag with the unique identifier. One example of an NDEF OTP is an NDEF short-record layout (SR=1). In such an example, one or more the card instructions may be configured to encode the OTP as an NDEF type 4 well known type text tag. In some examples, NDEF messages may include one or more records. The instructions may be configured to add one or more static tag records in addition to the OTP record.

In embodiments, the contactless card 100 may be activated and the resource locator may be set with the unique identifier to use with an OTP to perform authentication on each read operation. For example, each time the contactless card 100 is brought into range of the mobile device 302, the mobile device 302 may receive the OTP with the unique identifier encrypted and perform an authentication operation. If authenticated, the mobile device 302 may cause an action to occur, such as the launching the app to the landing page including the account balance and/or other information relating to the bank account.

FIG. 4 illustrates an example routine 400 that may be performed by a mobile device 302 to activate a contactless card 100. In block 402, the routine 400 includes receiving a first uniform resource locator (URL) for an application from the contactless card via a wireless interface. In embodiments, the application may be a banking app and configured to perform the activation. The first URL may be stored in the memory of the contactless card 100 and communicated to the mobile device 302 as part of a NDEF exchange including an NDEF read. The first URL may be processed by the operating system of the mobile device 302 and cause one or more events. Specifically, at block 404, the routine 400 includes launching the application responsive to receiving the first URL. In some instances, the app may be installed on the mobile device 302 and upon receiving the first URL, the operating system may cause the app to execute. In other instances, the app may not be installed on the mobile device 302. In these instances, the operating system may cause an app store to launch and the first URL may include information to direct the app store to a download page for the banking app. Embodiments are not limited in this manner.

At block 406, the routine 400 includes writing a second URL for conditions to the contactless card. In embodiments, the second URL may include a link, such as deep link or web link, to a location to cause the terms and conditions to be presented to the user on a display of the mobile device 302. The mobile device 302 may determine the second URL from the app, which may be a deep link stored locally within the files for the app. The app, upon being launched to perform an activation for a contactless card, may provide the deep link to the operating system and the operating system may generate a message, such as a "Write NDEFMessage message," including the deep link as the second URL to write to the contactless card. In other instances, the app may provide a link to a website, or a page of a website that can be accessed through a web browser. The operating system may write the website/page link to the contactless card using the NDEF message. The contactless card may store the second URL in memory until the next operation is ready to be performed for the activation sequence, e.g., the customer is ready to view the terms and conditions by bringing the card within range of the mobile device again.

In block 408, the routine 400 includes receiving the second URL to the conditions from the contactless card. In some instances, the app may present in a GUI on the display of the mobile device 302 instructions for the user to bring the contactless card within range of the mobile device 302 to read the terms and conditions, e.g., an instruction for the customer to tap the contactless card on the display. The mobile device 302 may perform a read operation. In response to the read operation, the mobile device 302 may receive the second URL from the contactless card in an NDEF message. The operating system of the mobile device 302 may process the second URL including causing the app or a web browser to open and display the terms and conditions. As mentioned, the second URL may be a link to a location within the app itself or to a website/page. Further and at block 410, the routine 400 includes presenting the conditions on a display of the mobile device. The terms and conditions may be presented in a GUI and are readable by the customer. The customer may then read the terms and conditions.

In block 412, the routine 400 includes writing a third URL for a unique identifier to identify a customer associated with the contactless card. The third URL including the unique identifier can be used by the mobile device 302 to identify the customer when the customer accepts the terms and conditions and to activate the card. The unique identifier may be any combination of alphanumeric symbols. In some instances, the unique identifier may be based on information relating to the contactless card, e.g., the account number, a zip code, an address, etc. and/or a credential entered by the customer. However, in other instances, the unique identifier may be completely random and generated by the app and/or operating system.

In block 414, the routine 400 includes receiving the third URL to affirm the conditions. In some instances, the app may present the terms and conditions to the customer in a display and include instructions for the customer to bring the contactless card within range of the mobile device 302 to accept the terms and conditions. In one example, the instructions may instruct the customer to tap the contactless card on the mobile device 302. The mobile device 302 may perform a read operation when the contactless card is within range. The mobile device 302 including the app may receive the third URL including the unique identifier to ensure that the same customer/card is being used to accept the terms and conditions. If the received unique identifier matches the previously written (block 412) unique identifier, the app may determine the customer accepted the terms and conditions.

In embodiments, the mobile device 302 may activate the contactless card once the customer accepts the terms and conditions. For example, the mobile device 302 including the app may communicate with the activation system 304 to activate the contactless card. In some examples, the mobile device 302 may communicate information indicating that the customer accepted the terms and conditions to the activation system 304 and information to identify the contactless card being activated. The information to identify the card may include an identifier associated with the customer (username), the account number for the contactless card, or other identifying information. The activation system 304 may utilize the information and activate the contactless card for use to perform transactions. At block 416, routine 400 includes determining the contactless card is activated responsive, at least in part, to the conditions being affirmed. In one example, the mobile device 302 may receive an indication from the activation system 304 indicating that the contactless card has been activated or if the activation failed. The mobile device 302 may notify the customer, e.g., by presenting information on the display, as to whether the contactless card is activated or not activated. In some instances, when the activation has failed, the app may present instructions to the customer how to fix the failed activation attempt.

In embodiments, once the card is activated, the customer may utilize the contactless card with the mobile device 302 to launch the app to a landing page or to perform another action. For example, for each additional instance that the card is brought within range of the mobile device 302, the operating system may make a detection and launch the app. The mobile device 302 may also perform a read operation and the contactless card may send information to the mobile device 302. In one example, the contactless card may generate a cryptogram which may include the unique identifier and an OTP and communicate in the cryptogram to the mobile device 302. The mobile device 302 may use the unique identifier and the OTP to authenticate the user and cause the landing page including sensitive information to be presented to the user.

FIG. 5 illustrates an example routine 500 that may be performed by a contactless card 100 to activate the contactless card 100 via the mobile device 302. In block 502, the routine 500 includes sending a first uniform resource locator (URL) for an application to a mobile device. In embodiments, the contactless card may send the first URL to the mobile device 302 responsive to a read operation via a wireless interface, such as an NFC interface. The first URL may be stored in a memory of the contactless card. The contactless card including circuitry may retrieve the first URL from the memory and communicate it to the mobile device 302 in a NDEF message. In some instances, the first URL may be a link to launch an app on the mobile device 302. In some instances, when the app is not installed on the mobile device 302, the mobile device 302 may launch an app store responsive to receiving the first URL.

In block 504, the routine 500 includes receiving a second URL for conditions related to activating the contactless card. The second URL may be received by the contactless card from the mobile device 302. In some instances, the mobile device 302 may perform an NFC write operation to write the second URL to the memory of the contactless card. The second URL may include a link to terms and conditions that are associated with the contactless card and may be included in an NDEF message. At block 506, the routine 500 includes storing, in the memory, the second URL by the contactless card.

In block 508, the routine 500 includes sending the second URL to the mobile device. In embodiments, the second URL may be communicated by the contactless card responsive to another read operation performed by the mobile device 302. The contactless card may send the second URL in an NDEF message to the mobile device 302. In embodiments, a read operation may be performed when the contactless card is brought into a wireless operating range of the mobile device 302, as previously discussed.

In block 510, the routine 500 receiving a third URL for a unique identifier to identify customer associated with the contactless card. The third URL may be received by the contactless card responsive to a write operation performed by the mobile device 302. Similar to the read operation, the write operation may be performed when the contactless card is brought into the wireless range of the mobile device 302. In some embodiments, a read and write operation may be performed as part of exchange during the same instance. For example, a customer may bring the contactless card within range of the mobile device 302 and the mobile device 302 may perform a read operation, as discussed in the block 508, to read the second URL. The mobile device 302 may determine that the resource locator 220 needs to be updated and may perform a write operation to write the third URL to the memory of the contactless card. The exchange may occur during a single instance when the customer brings the contactless card within the wireless range. Further and at block 512, the routine 500 includes storing, in the memory of the contactless card, the third URL.

At block 514, the routine 500 includes sending the third URL to the mobile device. In embodiments, the contactless card may send the third URL responsive to the contactless card being brought into a wireless range of the mobile device 302, as previously. In this instance, the customer may bring contactless card in range of the mobile device 302 responsive to instructions presented to the customer on the mobile device 302 and to accept or affirm the terms and conditions. The third URL may include a unique identifier that may be used by the mobile device 302 to confirm that the correct card/customer is affirming the terms and conditions. The third URL may be communicated to the mobile device 302 as part of a read operation and in an NDEF message.

Techniques discussed herein are not limited to performing an activation sequence for a contactless card and may be utilized to perform different operations or a sequence of action by utilize the contactless card as a "state machine." For example, a device with NFC read and write capabilities may utilize the memory of the contactless card to store data, such as an instruction or a block of instructions, as resource locators. The device may write the data as a resource locator to the memory of the contactless card to store a state in a sequence of actions or operations to be performed, for example. When the next action is to be performed, the device may read the resource locator and perform the next action based on what is stored in the memory. The device may write data including the next instruction(s) as a resource locator to the memory of the contactless card. This process may be repeated until the sequence of actions is completed. In some instances, the contactless card may include an OTP with a resource locator when it is being read such that the device may confirm and/or authenticate a user. The data communicated between the contactless card and the device may be communicated in a raw format or in encrypted format in NDEF message.

FIG. 6 illustrates an example routine 600 performed by a contactless card store data as a resource locator to perform operations in a sequence of actions or operations and the contactless card may be utilized as a state machine to perform operations. At block 602, the routine 600 includes storing an instruction or data in the memory of the contactless card. For example, a device, such as a mobile device or a point-of-sale (POS) terminal, may write data including instruction(s) as a resource locator in the memory of the contactless card. The data may be an instruction(s) to perform one or more operations to complete the sequence of operations. The device may perform an NFC write operation to write the data to the memory utilizing a short-range radio, such as NFC and in and NDEF message. The contactless card may store the data in the memory until the next read operation and/or until the data is overwritten. The data or instructions in the resource locator may include any operation that may be perform by a computing device. In an example, the data may be a link to a location, e.g., a web link or a link/pointer to a memory location. In another example, the data may be a computer instruction that may be executed and/or performed on a device. The instruction may be a high-level instruction, such as those utilized in scripting language, that may be executed by a device, or a low-level instruction, such as C code, JAVA code, assembly code, etc. Embodiments are not limited in this manner.

At block 604, the routine 600 includes providing the data to the device. For example, the device may execute an NFC read operation and the contactless card may generate an NDEF message to communicate the data to the device. In some embodiments, the data may be communicated in a cryptogram, as discussed herein. The data may be used by the device and cause an operation to be performed.

At block 606, the routine 600 includes determining whether new data including instruction(s) is received. For example, the contactless card may detect a write operation initiated by the device to write the new data including the next instruction(s) for the sequence of actions. If new data is detected, the contactless card may store the data in memory as indicated by the routine 600. If new data is not detected the routine 600 may end until another write operation is performed.

Routine 600 may be used to perform any type of sequence of operations by a device, such as completing a transaction by a POS terminal and/or on a mobile device, make payments via a banking app, change settings on a banking app, and so forth. Embodiments are not limited to these examples.

FIG. 7 is a timing diagram illustrating an example sequence for providing authenticated access according to one or more embodiments of the present disclosure. Sequence flow 700 may include contactless card 100 and client device 702, which may include an application 704 and processor 706. In some embodiments, the client device 702 may be a mobile device 302. In some instances, the follow sequence may be performed between the mobile device 302 and a contactless card 100 to perform one or more of the activation steps and/or authenticate a customer to launch an app to a landing page on the mobile device 302, as previously discussed with regards to FIG. 3.

At line 710, the application 704 communicates with the contactless card 100 (e.g., after being brought near the contactless card 100). Communication between the application 704 and the contactless card 100 may involve the contactless card 100 being sufficiently close to a card reader (not shown) of the client device 702 to enable NFC data transfer between the application 704 and the contactless card 100.

At line 708, after communication has been established between client device 702 and contactless card 100, contactless card 100 generates a message authentication code (MAC) cryptogram. In some examples, this may occur when the contactless card 100 is read by the application 704. In particular, this may occur upon a read, such as an NFC read, of a near field data exchange (NDEF) tag, which may be created in accordance with the NFC Data Exchange Format. For example, a reader application, such as application 704, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 100 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator or locator (e.g., as a formatted string). For example, the MAC cryptogram may include the resource locator including the unique identifier. In some examples, application 704 may be configured to transmit a request to contactless card 100, the request comprising an instruction to generate a MAC cryptogram.

At line 712, the contactless card 100 sends the MAC cryptogram to the application 704. In some examples, the transmission of the MAC cryptogram occurs via NFC, however, the present disclosure is not limited thereto. In other examples, this communication may occur via Bluetooth, Wi-Fi, or other means of wireless data communication. At line 714, the application 704 communicates the MAC cryptogram to the processor 706.

At line 716, the processor 706 verifies the MAC cryptogram pursuant to an instruction from the application 122. For example, the MAC cryptogram may be verified, as explained below. In some examples, verifying the MAC cryptogram may be performed by a device other than client device 702, such as a server of a banking system in data communication with the client device 702. For example, processor 706 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

FIG. 8 illustrates an NDEF short-record layout (SR=1) data structure 800 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well-known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

FIG. 9 illustrates a diagram of a system 900 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 902, 926 may be required for each part of the portfolio on which the one or more applets is issued. For example, the first master key 902 may comprise an Issuer Cryptogram Generation/Authentication Key (Iss-Key-Auth) and the second master key 926 may comprise an Issuer Data Encryption Key (Iss-Key-DEK). As further explained herein, two issuer master keys 902, 926 are diversified into card master keys 908, 920, which are unique for each card. In some examples, a network profile record ID (pNPR) 522 and derivation key index (pDKI) 924, as back office data, may be used to identify which Issuer Master Keys 902, 926 to use in the cryptographic processes for authentication. The system performing the authentication may be configured to retrieve values of pNPR 922 and pDKI 924 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 908 and Card-Key-Dek 920). The session keys (Aut-Session-Key 932 and DEK-Session-Key 910) may be generated by the one or more applets and derived by using the application transaction counter (pATC) 904 with one or more algorithms. To fit data into the one or more algorithms, only the 2 low order bytes of the 4-byte pATC 904 is used. In some examples, the four byte session key derivation method may comprise: F1:=PATC(lower 2 bytes)||'F0'||'00'||PATC (four bytes) F1:=PATC(lower 2 bytes)||'0F'||'00'||PATC (four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC 904 counter. At each tap of the contactless card, pATC 904 is configured to be updated, and the card master keys Card-Key-AUTH 508 and Card-Key-DEK 920 are further diversified into the session keys Aut-Session-Key 932 and DEK-Session-KEY 910. pATC 904 may be initialized to zero at personalization or applet initialization time. In some examples, the pATC counter 904 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 932. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 932, as explained above. As explained above, the low order two bytes of the counter may be used to diversify for the one or more MAC session keys. As explained below, AUT-Session-Key 932 may be used to MAC data 906, and the resulting data or cryptogram A 914 and random number RND may be encrypted using DEK-Session-Key 910 to create cryptogram B or output 918 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 910 derived from the Card-Key-DEK 920. In this case, the ATC value for the session key derivation is the least significant byte of the counter pATC 904.

The format below represents a binary version example embodiment. Further, in some examples, the first byte may be set to ASCII 'A'.

| Message Format | | | | |
|---|---|---|---|---|
| 1<br>0x43 (Message Type 'A') | 2<br>Version | 4<br>pATC | 8<br>RND | 8<br>Cryptogram A (MAC) |
| Cryptogram A (MAC) | 8 bytes | | | |
| MAC of | | | | |
| 2<br>Version | 8<br>pUID | 4<br>pATC | 4<br>Shared Secret | 18 bytes input data |

-continued

| Message Format | | | | |
|---|---|---|---|---|
| 1<br>0x43 (Message Type ‘A’) | 2<br>Version | 4<br>pATC | | 16<br>Cryptogram B |
| Cryptogram A (MAC) | 8 bytes | | | |
| MAC of<br>2<br>Version | 8<br>pUID | 4<br>pATC | 4<br>Shared Secret | 18 bytes input data |
| Cryptogram B | 16 | | | |
| Sym Encryption of<br>8<br>RND | 8<br>Cryptogram A | | | |

Another exemplary format is shown below. In this example, the tag may be encoded in hexadecimal format.

| Message Format | | | | |
|---|---|---|---|---|
| 2<br>Version | 8<br>pUID | 4<br>pATC | 8<br>RND | 8<br>Cryptogram A (MAC) |
| 8 bytes | | | | |
| 8<br>pUID | 8<br>pUID | 4<br>pATC | 4<br>Shared Secret | 18 bytes input data |
| Message Format | | | | |
| 2<br>Version | 8<br>pUID | 4<br>pATC | | 16<br>Cryptogram B |
| 8 bytes | | | | |
| 8<br>pUID | pUID | 4<br>pATC | 4<br>Shared Secret | 18 bytes input data |
| Cryptogram B | 16 | | | |
| Sym Encryption of<br>8<br>RND | 8<br>Cryptogram A | | | |

The UID field of the received message may be extracted to derive, from master keys Iss-Key-AUTH 502 and Iss-Key-DEK 926, the card master keys (Card-Key-Auth 908 and Card-Key-DEK 920) for that particular card. Using the card master keys (Card-Key-Auth 508 and Card-Key-DEK 920), the counter (pATC) field of the received message may be used to derive the session keys (Aut-Session-Key 932 and DEK-Session-Key 910) for that particular card. Cryptogram B 918 may be decrypted using the DEK-Session-KEY, which yields cryptogram A 914 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 914, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 932. The input data 906 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 912, data 906 is processed through the MAC using Aut-Session-Key 932 to produce MAC output (cryptogram A) 914, which is encrypted.

In order to provide additional protection against brute force attacks exposing the keys on the card, it is desirable that the MAC cryptogram 914 be enciphered. In some examples, data or cryptogram A 914 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 910. In the encryption operation 916, data or cryptogram A 914 and RND are processed using DEK-Session-Key 510 to produce encrypted data, cryptogram B 918. The data 914 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

FIG. 10 illustrates a method 1000 for generating a cryptogram. For example, at block 1002, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 1004, Issuer Master Keys may be diversified by combining them with the card's unique ID number (pUID) and the PAN sequence number (PSN) of one or more applets, for example, a payment applet.

At block 1006, Card-Key-Auth and Card-Key-DEK (unique card keys) may be created by diversifying the Issuer Master Keys to generate session keys which may be used to generate a MAC cryptogram.

At block 1008, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

FIG. 11 depicts an exemplary process 1100 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1102, and other data, such as data to be protected, which it may secure share with the recipient.

At block 1104, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1106, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1108, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1110, the encrypted MAC is transmitted, from the sender to the recipient, with sufficient information to identify additional secret information (such as shared secret, master keys, etc.), for verification of the cryptogram.

At block 1112, the recipient uses the received counter value to independently derive the two derived session keys from the two master keys as explained above.

At block 1114, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1116, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1102) and a new set of session keys may be created (at block 1110). In some examples, the combined random data may be discarded.

FIG. 12 illustrates a method 800 for card activation according to an example embodiment. For example, card activation may be completed by a system including a card, a device, and one or more servers. The contactless card, device, and one or more servers may reference same or similar components that were previously explained a, such as contactless card 100, client device 702, and a server.

In block 1202, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1204, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1206, the one or more portions of the data may be communicated to one or more servers, such as a card issuer server. For example, one or more encrypted portions of the data may be transmitted from the device to the card issuer server for activation of the card.

In block 1208, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1210, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

What is claimed is:

1. A computer-implemented method, comprising:

providing, by a contactless card responsive to a first wireless read by a mobile device via a near-field communication (NFC) interface, a first instruction for an application, the first instruction stored in a memory of the contactless card, the first instruction comprising a first resource locator to cause the application on the mobile device to initiate a process of activation of the contactless card;

storing, by the contactless card in the memory, a second instruction for conditions related to the contactless card, the second instruction received from the mobile device;

providing, by the contactless card responsive to a second wireless read by the mobile device via the NFC interface, the second instruction for the conditions to the mobile device and information associated with the contactless card, the second instruction comprising a second resource locator to cause the application on the mobile device to display terms and conditions related to the activation of the contactless card on a display of the mobile device;

presenting, by the mobile device, the conditions associated with the contactless card on the display of the mobile device based on the second resource locator received via a wireless interface;

storing, by the contactless card in the memory, a third instruction for a unique identifier received from the mobile device to identify the information associated with the contactless card;

providing, by the contactless card responsive to a third wireless read to the mobile device via the NFC interface, the third instruction to affirm the conditions, based on the unique identifier at the third instruction, the third instruction comprising the unique identifier to indicate acceptance of the terms and conditions and authorize the activation of the contactless card;

confirming, by the mobile device, that the same contactless card is being presented to affirm the conditions by reading the third instruction via the NFC interface and verifying the unique identifier; and determining, by the mobile device, the contactless card is activated responsive, at least in part, to the conditions being affirmed and based on communication with an activation system via one or more wired and/or wireless interconnects.

2. The computer-implemented method of claim 1, comprising:

executing an applet based on instructions received from the mobile device, the applet to generate a cryptogram; and providing, responsive to a fourth query, the cryptogram to the mobile device, the cryptogram comprising an encrypted unique identifier generated from the unique identifier.

3. The computer-implemented method of claim 1, wherein providing the first instruction comprises providing the first instruction via a wireless interface configured for a NFC protocol.

4. The computer-implemented method of claim 1, comprising storing a fourth instruction from the mobile device, the fourth instruction comprising a second unique identifier of the contactless card and a one-time passcode.

5. The computer-implemented method of claim 4, comprising providing, to the mobile device, the fourth instruction via a wireless interface, wherein the first, second, third, and fourth instructions comprise links.

6. The computer-implemented method of claim 1, wherein the second instruction for the conditions is a deep link to a location within the application.

7. A system, comprising:

a mobile device comprising a processor and an application configured to perform activation;

a contactless card comprising processing circuitry coupled with memory comprising code configured for execution by the processing circuitry, wherein the mobile device and the contactless card communicate wirelessly to:

provide, by the contactless card responsive to a first wireless read by the mobile device, a first instruction for the application via a wireless interface, the first instruction stored in the memory of the contactless card, the first instruction to cause the application on the mobile device to initiate a process of the activation of the contactless card;

store, by the contactless card in the memory, a second instruction for conditions related to the contactless card, the second instruction received from the mobile device;

provide, by the contactless card responsive to a second wireless read by the mobile device, the second instruction for the conditions to the mobile device and information associated with the contactless card, the second instruction to cause the application on the mobile device to display terms and conditions related to the activation of the contactless card on a display of the mobile device;

present, by the mobile device, the conditions associated with the contactless card on the display of the mobile device based on the second instruction received via the wireless interface;

store, by the contactless card in the memory, a third instruction for a unique identifier received from the mobile device to identify the information associated with the contactless card;

provide, by the contactless card responsive to a third wireless read to the mobile device, the third instruction to affirm the conditions, based on the unique identifier at the third instruction, the third instruction to indicate acceptance of the terms and conditions and authorize the activation of the contactless card;

confirm, by the mobile device, that the same contactless card is being presented to affirm the conditions by reading the third instruction via the wireless interface and verifying the unique identifier; and determining, by the mobile device, the contactless card is activated responsive, at least in part, to the conditions being affirmed and based on communication with an activation system via one or more wired and/or wireless interconnects.

8. The system of claim 7, the processing circuitry to:

execute an applet based on instructions received from the mobile device, the applet to generate a cryptogram; and provide, responsive to a fourth query, the cryptogram to the mobile device, the cryptogram comprising an encrypted unique identifier generated from the unique identifier.

9. The system of claim 7, further comprising the wireless interface is configured for a near-field communication (NFC) protocol.

10. The system of claim 7, the processing circuitry to store a fourth instruction comprising a second unique identifier of the contactless card and a one-time passcode.

11. The system of claim 10, the processing circuitry to provide the fourth instruction via the wireless interface.

12. The system of claim 10, wherein the second instruction for the conditions is a deep link to a location within the application, wherein the first, third, and fourth instructions comprise links.

13. A non-transitory computer-readable medium comprising a set of instructions that, in response to being executed by a processor of a mobile device, cause the processor to:

receive a first instruction for an application from a contactless card via a wireless interface, the first instruction to cause the application on the mobile device to initiate a process of activation of the contactless card;

write a second instruction to the contactless card via the wireless interface;

receive from the contactless card via the wireless interface, a message comprising information related to the contactless card and the second instruction, the second instruction to cause the application on the mobile device to display terms and conditions related to the activation of the contactless card on a display of the mobile device;

generate a first unique identifier based on the information of the contactless card;

presenting, by the mobile device, the conditions associated with the contactless card on the display of the mobile device based on the second instruction received via the wireless interface;

write, via the wireless interface, a third instruction comprising the first unique identifier to the contactless card;

receive, via the wireless interface, the third instruction from the contactless card presented to affirm the conditions, the third instruction to indicate acceptance of the terms and conditions and authorize the activation of the contactless card;

confirm by the mobile device, that the same contactless card is being presented based on the first unique identifier and the third instruction; and determine by the mobile device, that the contactless card is activated responsive, at least in part, to the conditions being affirmed by the same contactless card.

14. The non-transitory computer-readable medium of claim 13, wherein the set of instructions in response to being executed by the processor to cause the processor to:

send applet instructions to the contactless card via the wireless interface, the applet instructions to instruct an applet of the contactless card to generate a cryptogram; and receive the cryptogram at least partially based on the first unique identifier.

15. The non-transitory computer-readable medium of claim 13, wherein the wireless interface issues at least one of a near-field communication (NFC) protocols.

16. The non-transitory computer-readable medium of claim 13, the processor to write a fourth instruction to the contactless card via the wireless interface, the fourth instruction comprising a second unique identifier of the contactless card and a one-time passcode.

17. The non-transitory computer-readable medium of claim 16, the processor to:

receive the fourth instruction from the contactless card via the wireless interface;

send at least the one-time passcode to a server; and receive a response responsive to sending the one-time passcode, the response comprising data associated with the contactless card.

18. The non-transitory computer-readable medium of claim 17, wherein the response is received via a short message service message or an application message in the application.

19. The non-transitory computer-readable medium of claim 13, wherein the application is launched by an operating system responsive to receiving the first instruction.

20. The non-transitory computer-readable medium of claim 13, wherein the second instruction for the conditions is a deep link to a location within the application, wherein the first, third, and fourth instructions comprise links.

* * * * *